(12) United States Patent
Chamberlin et al.

(10) Patent No.: US 7,712,697 B1
(45) Date of Patent: May 11, 2010

(54) CORE WINDING APPARATUS AND METHOD OF WINDING A CORE

(75) Inventors: Bradley D. Chamberlin, Pendleton, IN (US); Mark A. Stephenson, Fairland, IN (US); Larry A. Kubes, Climax, IN (US)

(73) Assignee: Remy Technologies, L.L.C., Pendleton, IN (US)

( * ) Notice: Subject to any disclaimer, the term of this patent is extended or adjusted under 35 U.S.C. 154(b) by 0 days.

(21) Appl. No.: 12/478,829

(22) Filed: Jun. 5, 2009

(51) Int. Cl.
*H02K 15/085* (2006.01)
*B65H 81/06* (2006.01)

(52) U.S. Cl. ............... 242/432.6; 242/432; 242/432.2

(58) Field of Classification Search .............. 242/432, 242/432.1–432.3, 432.6
See application file for complete search history.

(56) References Cited

U.S. PATENT DOCUMENTS

| | | | |
|---|---|---|---|
| 6,530,140 B2 * | 3/2003 | Maeda et al. ............... 29/596 |
| 6,553,650 B2 * | 4/2003 | Nakamura et al. ........... 29/605 |
| 6,712,307 B2 * | 3/2004 | Iwase et al. ................ 242/433 |
| 6,865,796 B1 * | 3/2005 | Oohashi et al. .............. 29/596 |
| 7,004,420 B2 * | 2/2006 | Stratico et al. ............ 242/432.2 |
| 7,159,816 B2 * | 1/2007 | Sweeney et al. ............. 242/434 |
| 7,213,784 B2 | 5/2007 | Lundahl |
| 7,243,873 B2 * | 7/2007 | Noji ........................... 242/432 |
| 7,543,774 B2 * | 6/2009 | Stroebel et al. ........... 242/433.4 |
| 2003/0089812 A1 * | 5/2003 | Iwase et al. ................ 242/433 |
| 2004/0173710 A1 * | 9/2004 | Stratico et al. .............. 242/432 |
| 2005/0029385 A1 * | 2/2005 | Stratico et al. ........... 242/432.2 |
| 2005/0133655 A1 | 6/2005 | Hashimoto et al. |
| 2005/0247815 A1 * | 11/2005 | Sweeney et al. ............. 242/434 |
| 2006/0169822 A1 * | 8/2006 | Noji ......................... 242/432.2 |
| 2006/0273214 A1 * | 12/2006 | Stratico et al. .............. 242/432 |
| 2007/0181732 A1 * | 8/2007 | Noji ......................... 242/432.2 |
| 2008/0203213 A1 | 8/2008 | Noji |
| 2009/0057473 A1 * | 3/2009 | Ujiie ........................ 242/433.3 |
| 2009/0065623 A1 * | 3/2009 | Touzet ....................... 242/434.7 |

* cited by examiner

*Primary Examiner*—Evan H Langdon
(74) *Attorney, Agent, or Firm*—Cantor Colburn LLP

(57) ABSTRACT

An apparatus for winding wire about a tooth of a core includes an amount of wire, a winding member configured to receive a portion of the amount of wire, and a winding device operatively coupled to the winding member. The winding device being configured to apply a number of wraps of the amount of wire to at least one of a plurality of teeth of the core. The number of wraps including a number of twists that is fewer than the number of wraps.

16 Claims, 3 Drawing Sheets

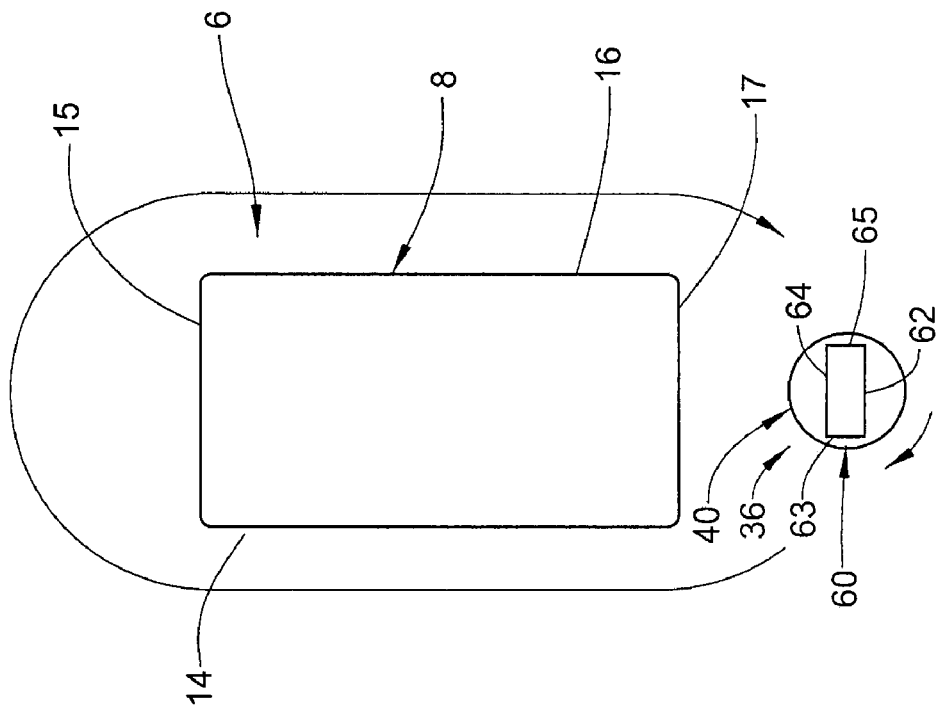
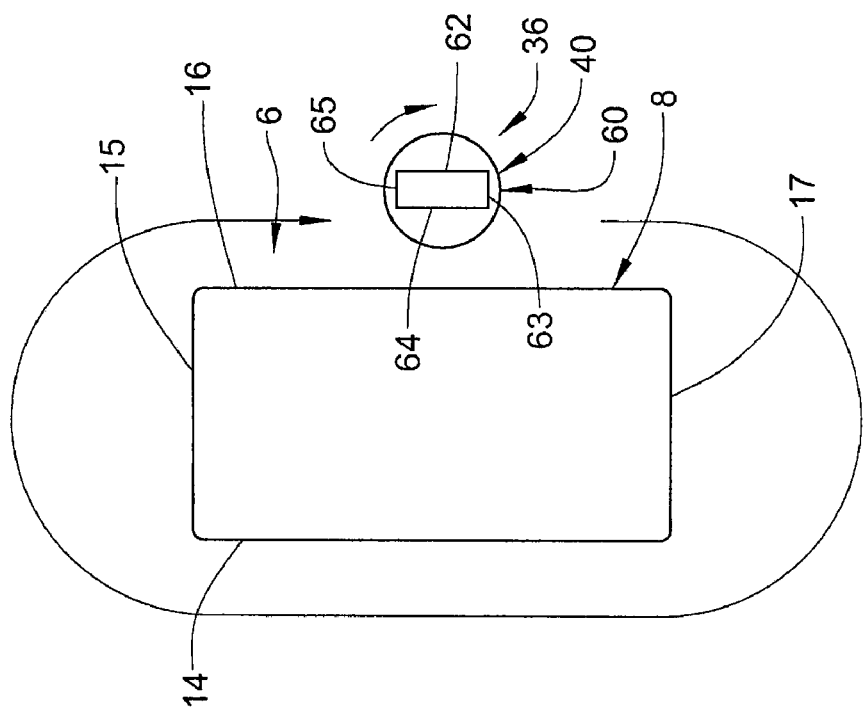

CORE WINDING APPARATUS AND METHOD OF WINDING A CORE

BACKGROUND OF THE INVENTION

The subject matter disclosed herein relates to the art of electrical machines and, more particularly, to a core winding apparatus and method of winding a core.

At present, full stator cores are wound with round wire. The stator core is held stationary and the round wire is fed through a winding needle that is rotated about a stator tooth. Once the stator tooth is wound, the wire is advanced to a subsequent stator tooth. At each tooth, the winding needle not only travels along a circular path but also moves in and out to layer the wire. Upon exiting the winding needle, the wire twists as a result of rotational forces developed while traveling along the circular path.

BRIEF DESCRIPTION OF THE INVENTION

According to one aspect of the exemplary embodiment, an apparatus for winding wire about a tooth of a core includes an amount of wire, a winding member configured to receive a portion of the amount of wire, and a winding device operatively coupled to the winding member. The winding member being configured to apply a number of wraps of the amount of wire to each of at least one of a plurality of stator teeth of the full stator core. The number of wraps including a number of twists that is fewer than the number of wraps.

According to another aspect of the exemplary embodiment, a method of winding a core having a plurality of teeth includes passing a portion of the length of wire through a winding member, and applying a number of wraps of the wire to at least one of the plurality of teeth. The wraps of wire including a number of twists that is fewer than the number of wraps.

BRIEF DESCRIPTION OF THE DRAWING

The above, as well as other advantages of the present invention, will become readily apparent to those skilled in the art from the following detailed description when considered in light of the accompanying drawings in which:

FIG. 4 is an elevational view of the rectangular wire of FIG. 3 in a third orientation being applied without twisting to a tooth of the core of FIG. 1; and FIG. 5 is an elevational view of the rectangular wire of FIG. 4 in a third orientation being applied without twisting to a tooth of the core of FIG. 1.

The detailed description explains embodiments of the invention, together with advantages and features, by way of example with reference to the drawings.

DETAILED DESCRIPTION OF THE INVENTION

Figure 1:
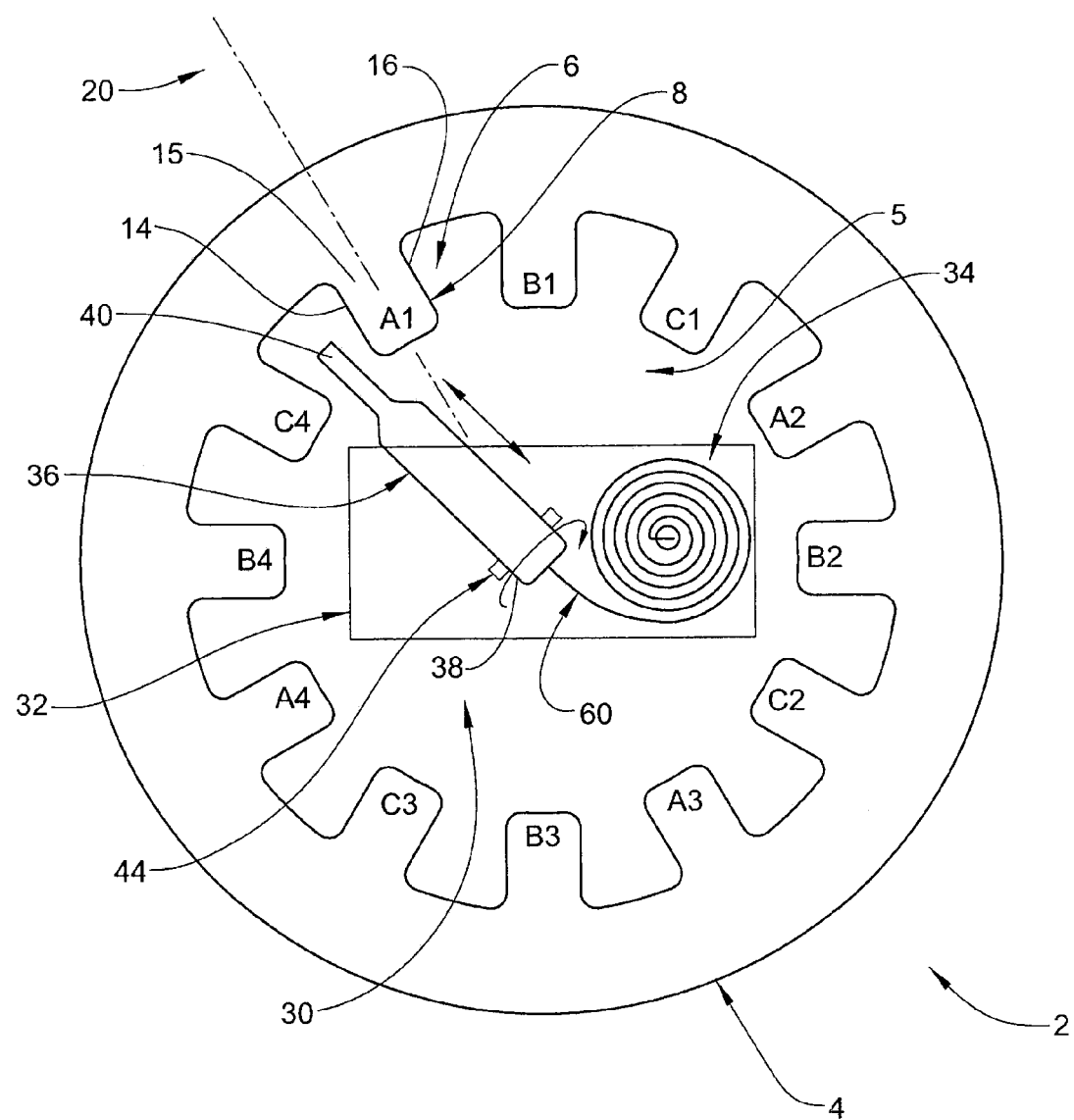
FIG. 1 is an elevational view of a core being wound by a core winding apparatus in accordance with an exemplary embodiment.

With reference to FIG. 1, a core, shown in the form of a full stator core configured to be wound in accordance with an exemplary embodiment is indicated generally at 2. Stator core 2 includes a main body 4 having an inner diameter 5 provided with a plurality of stator teeth, one of which is indicated at 6. Stator teeth 6 are arranged in a series of poles, e.g., $A_1$-$A_4$; $B_1$-$B_4$; and $C_1$-$C_4$ that collectively define electrical phases A, B, and C. Each stator tooth includes a main body 8 having a first substantially planar surface 14, a second substantially planar surface 15, a third substantially planar surface 16, and a fourth substantially planar surface 17 (FIG. 2) so as to define a generally rectangular cross-section. As shown, each stator tooth 6 includes a central axis 20 that passes from a central point of inner diameter 5 radially through each stator tooth 6. In accordance with an exemplary embodiment, each stator tooth 6 is wound with wire in order to achieve a necessary magnetic field to operate an associated electric machine.

In accordance with an exemplary embodiment, stator core 2 is wound using a winding apparatus 30 that is arranged entirely within inner diameter 5. Winding apparatus 30 includes a winding device 32 provided with a bobbin 34 and a winding member shown in the form of a winding needle 36. At this point it should be understood that the term bobbin refers to any device that is configured to retain a selected amount of wire. Winding needle 36 includes a first end 38 that extends to a second end 40. Winding apparatus 30 also includes a winding element 44 that is operatively connected to winding needle 36. In further accordance with one exemplary embodiment, bobbin 34 is wound with a selected amount of wire 60 that includes a plurality of sides 62-65 to define a rectangular cross-section. Winding apparatus 30, as will be discussed more fully below, is selectively operated in order to wrap each of the plurality of stator teeth 6 with a continuous, untwisted length of wire 60. More specifically, bobbin 34 is loaded with enough wire 60 to wrap, for example each of poles $A_1$-$A_4$ in a single winding operation. As such, each stator tooth corresponding to poles $A_1$-$A_4$ is wrapped with a continuous piece of untwisted wire in a manner that will be described more fully below.

Figure 2:
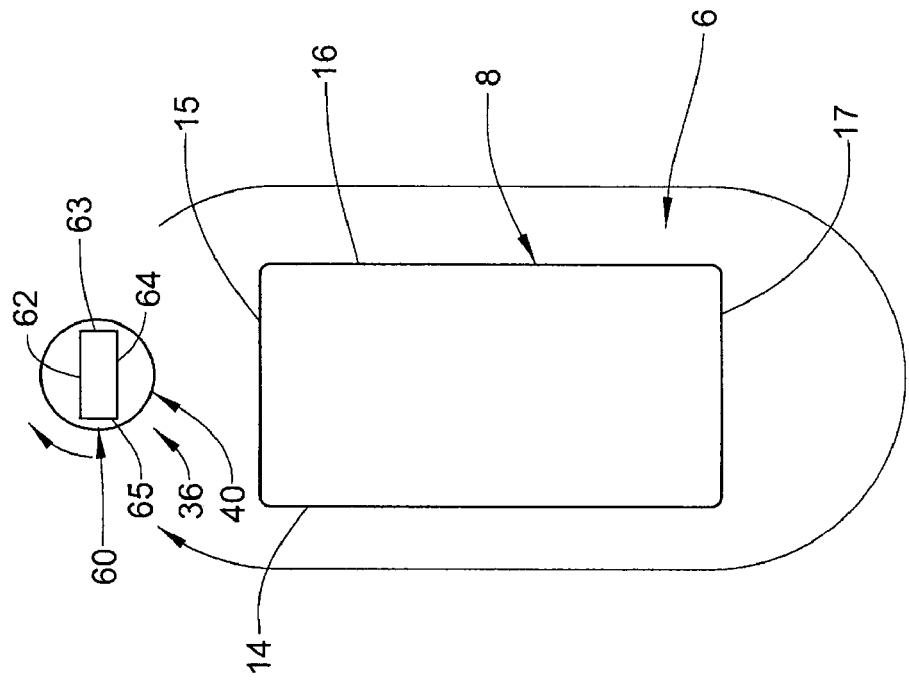
FIG. 2 is an elevational view of a rectangular wire in a first orientation being applied without twisting to a tooth of the core of FIG. 1.

As best shown in FIGS. 2 though 5, winding device 32 translates about each of the plurality of stator teeth 6 wrapping wire 60 about planar surfaces 14-17. In addition to the translation of winding device 32, winding element 44 rotates winding needle 36 causing only one of the plurality of sides 62-65 of wire 60 to face each planar surface 14-17 of stator tooth 6. In accordance with another aspect, instead of rotating winding element 44, winding device 32 is configured to be rotated about a longitudinal axis defined by winding needle 36. In this manner, stator tooth 6 is wrapped with a number of wraps of wire, with the wire having fewer twists than the total number of wraps. In accordance with one aspect of the invention, the number of twists will be one fewer than the total number of wraps. In accordance with another aspect of the invention, the number of twists will be between one fewer and half the total number of wraps. In accordance with yet another aspect, the number of twists will be fewer than half of the number of wraps. In accordance with still another aspect of the invention, the wire will remain untwisted. In any case, stator tooth 6 will be wrapped with rectangular wire having few twists to enable a tight spacing of wire to minimize an overall form factor of stator core 2. More specifically, as shown in FIG. 2, winding needle 36 positions side 64 of wire 60 facing surface 14 of stator tooth 6. Winding device 32 then translates about stator tooth 6 positioning winding needle 36 adjacent surface 15.

Figure 3:
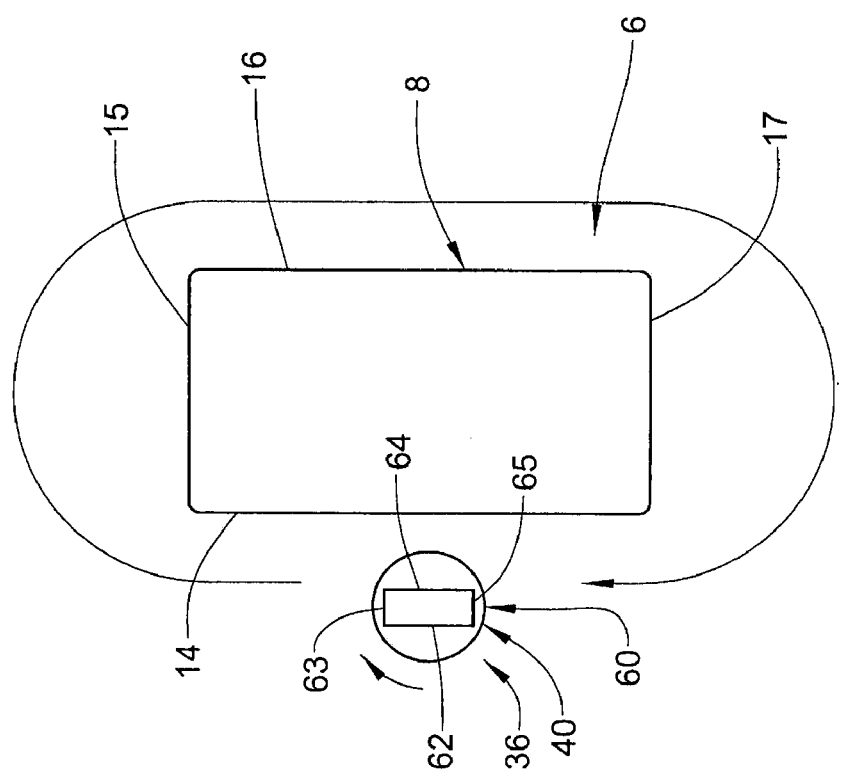
FIG. 3 is an elevational view of the rectangular wire of FIG. 2 in a second orientation being applied without twisting to a tooth of the core of FIG. 1.

As best shown in FIG. 3, as winding device 32 translates about stator tooth 6, winding element 44 rotates causing side 64 of wire 60 to face surface 15. Similarly, as shown in FIG. 4, continued translation of winding device 32 results in a corresponding rotation of winding element 44 such that side 64 faces surface 16 of stator tooth 6. Likewise, as shown in FIG. 5, side 64 also faces fourth surface 17 before the wrap is completed. In addition to the translation about stator tooth 6, winding apparatus 30 oscillates along a substantially linear path defined by axis 20. In this manner, consecutive adjacent wraps are applied and layered in order to apply predetermined amount of wire to each stator tooth.

At this point, it should be understood that an exemplary embodiment provides an apparatus and method of applying a wire, particularly wire having a rectangular cross-section, to a stator tooth. More specifically, the apparatus and method enables a continuous, uninterrupted and untwisted application of wire to a number of stator teeth in order to enhance manufacturing efficiencies and provide a more compact profile on each stator tooth. This is, instead of using round wire, which tends to twist and create bulk, the apparatus of the present invention fits entirely within a full stator core so as to apply a continuous, untwisted length of rectangular wire. In this manner, the stator core will be formed having a smaller profile thereby enabling the construction of even smaller electric machines. In addition to reducing twisting, exemplary embodiments provide a stator core having a minimal number of connections between the stator teeth and a phase lead. Also, while described in connection with a full stator core, it should be understood that the exemplary embodiment can also be employed to wind armatures, segmented cores, flexible cores, rotating cores, stationary cores and the like. In addition, while the winding member is described as a winding needle, various other devices configured to feed wire onto a core tooth can be employed.

While embodiments of the invention have been described above, it will be understood that those skilled in the art, both now and in the future, may make various improvements and enhancements which fall within the scope of the claims which follow. These claims should be construed to maintain the proper protection for the invention first described.

The invention claimed is:

1. An apparatus for winding wire about a tooth of a core, the apparatus comprising:
    an amount of wire wound on a bobbin;
    a winding member configured to receive a portion of the amount of wire; and
    a winding device operatively coupled to the winding member, the winding device being configured to apply a number of wraps of the amount of wire to at least one of a plurality of teeth of the core, the number of wraps including a number of twists that is fewer than the number of wraps, wherein the winding device rotates the winding member and the bobbin about the tooth.

2. The winding apparatus according to claim 1, further comprising: a winding element operatively coupled to the winding member, the winding element being selectively operated to rotate the winding member about a longitudinal axis.

3. The winding apparatus according to claim 1, wherein the winding member is configured to oscillate along a substantially linear path while rotating the winding member about the at least one of the plurality of teeth.

4. The winding apparatus according to claim 1, wherein the bobbin is operatively connected to the winding device.

5. The winding apparatus according to claim 1, wherein the winding device is configured to be inserted entirely into an interior portion of the core.

6. A method of winding a core having a plurality of teeth, the method comprising:
    passing a portion of the length of wire from a bobbin through a winding member; and
    applying a number of wraps of the wire to at least one of the plurality of teeth, the wraps of wire including a number of twists that is fewer than the number of wraps, wherein applying the wire to the at least one of the plurality of teeth includes shifting both the winding member and the bobbin axially about the one of the plurality of teeth.

7. The method of claim 6, wherein the number of twists is one fewer than the number of wraps.

8. The method of claim 7, wherein the number of twists is between one fewer than the number of wraps and half the number of wraps.

9. The method of claim 8, wherein the number of twists is fewer than half the number of wraps.

10. The method of claim 9, wherein there are no twists in the wire.

11. The method of claim 6, further comprising: rotating the winding member about a longitudinal axis.

12. The method of claim 6, further comprising: oscillating at least one of the winding member longitudinally along the at least one of the plurality of teeth.

13. The method of claim 11, wherein rotating the winding member about a longitudinal axis include rotating the winding member and the length of wire about the longitudinal axis.

14. The method of claim 6, wherein applying the wire to the at least one of the plurality of teeth includes applying wire having a plurality of sides that define a rectangular cross-section.

15. The method of claim 14, further comprising: maintaining only one of the plurality of sides facing the at least one of the plurality of teeth while applying the wire.

16. The method of claim 6, further comprising:
    repositioning the winding member; and
    applying the wire to another one of the plurality of teeth of the core.

* * * * *